(12) United States Patent
Hung

(10) Patent No.: US 6,783,143 B1
(45) Date of Patent: Aug. 31, 2004

(54) HUB POST FOR A BICYCLE

(76) Inventor: Wen-Chung Hung, No. 145-3, Hsinan Rd., Wujih Hsiang, Taichung Hsien (TW)

( * ) Notice: Subject to any disclaimer, the term of this patent is extended or adjusted under 35 U.S.C. 154(b) by 0 days.

(21) Appl. No.: 10/653,983

(22) Filed: Sep. 4, 2003

(51) Int. Cl.[7] .............................................. B62J 25/00
(52) U.S. Cl. ................. 280/291; 280/288.4; 301/110.5; 74/564
(58) Field of Search ........................... 301/110.5, 124.1; 280/288.4, 291; 74/564

(56) References Cited

U.S. PATENT DOCUMENTS

| | | | | |
|---|---|---|---|---|
| 6,142,499 A | * | 11/2000 | Hsieh et al. ................. | 280/291 |
| 6,199,887 B1 | * | 3/2001 | Lee ............................. | 280/291 |
| 6,499,378 B1 | * | 12/2002 | Ho .............................. | 74/564 |

* cited by examiner

*Primary Examiner*—Russell D. Stormer
(74) *Attorney, Agent, or Firm*—Rosenberg, Klein & Lee

(57) ABSTRACT

A hub post is mounted on a wheel axle of a bicycle and has an anti-rotation locking pin to keep the hub post from rotating and loosening and detaching from the wheel axle. The anti-rotation locking pin is mounted in a countersunk through hole in a closed end of the hub post and is securely held in an axle mounting slot in a fork of the bicycle.

2 Claims, 5 Drawing Sheets

HUB POST FOR A BICYCLE

BACKGROUND OF THE INVENTION

1. Field of the Invention

The present invention relates to a hub post and particularly a hub post for a bicycle.

2. Description of Related Art

Bicycles are convenient and common vehicles for transportation, exercises and even acrobatics. Many bicycles have at least two hub posts mounted on rear wheel hubs so a person can stand on the hub posts while a second person propels the bicycle. Bicycles used for acrobatics usually have hub posts mounted on front and rear wheel hubs so a person can stand selectively on either the front or rear wheel hub posts when performing acrobatics or otherwise use the hub posts to perform tricks.

With reference to FIGS. 5 and 6, conventional hub posts (66) are tubular, have respectively open ends (not numbered) and closed ends (not numbered) and are mounted on a front wheel hub (not shown), rear wheel hub (not shown) or both wheel hubs of a bicycle (not numbered). The bicycle has a front and rear axle slot (120) to which the front and rear hubs are attached respectively. Each wheel hub has an axle (21) that has two threaded ends (not numbered) and extends through the hub so the ends are mounted in and extend through the axle slots (120). The closed end of each hub post (66) has a central through hole (661) that is mounted around one threaded end of the axle (21). A nut (662) is screwed onto the threaded end of the axle (21) to hold the hub and the hub post (66) in place.

With reference to FIG. 7, another embodiment of the hub post (66') that has a threaded central through hole (67') defined through the closed end. The threaded central through hole (67') is screwed onto the threaded end of the axle (21) to hold the hub and the hub post (66') in place.

However, the conventional hub posts (66, 66') for bicycles have the following disadvantages.

When a person stands on the hub post (66), the through hole (661) or the threaded hole (67') bears all of a person's body weight which will deform and expand the through hole (661) or the threaded hole (67'). The expanded through hole (661) or the expanded threaded hole (67') will cause the hub post (66) to rotate, loosen and release from the axle (21). Consequently, the conventional hub post (66) is dangerous for a person to stand on.

The present invention provides a hub post to mitigate or obviate the aforementioned problem.

SUMMARY OF THE INVENTION

An objective of the present invention is to provide a hub posts for a bicycle that will not rotate, loosen and disconnect from the wheel hubs of the bicycle. The hub posts are attached to any conventional axle of a bicycle, which are mounted in conventional forks having a slot. The hub posts are tubular and have a closed end, an open end and an anti-rotation locking pin. The closed end as a central through hole and multiple countersunk through holes arranged around the central through hole. The anti-rotation locking pin is mounted in one the countersunk through holes and the fork slot so the hub post will not rotate when a person stands on the hub post. If the countersunk through holes in which the anti-rotation locking pin is mounted deforms or expand, the anti-rotation locking pin can be mounted in another one of the countersunk through holes to elongate the useful life of the hub post.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
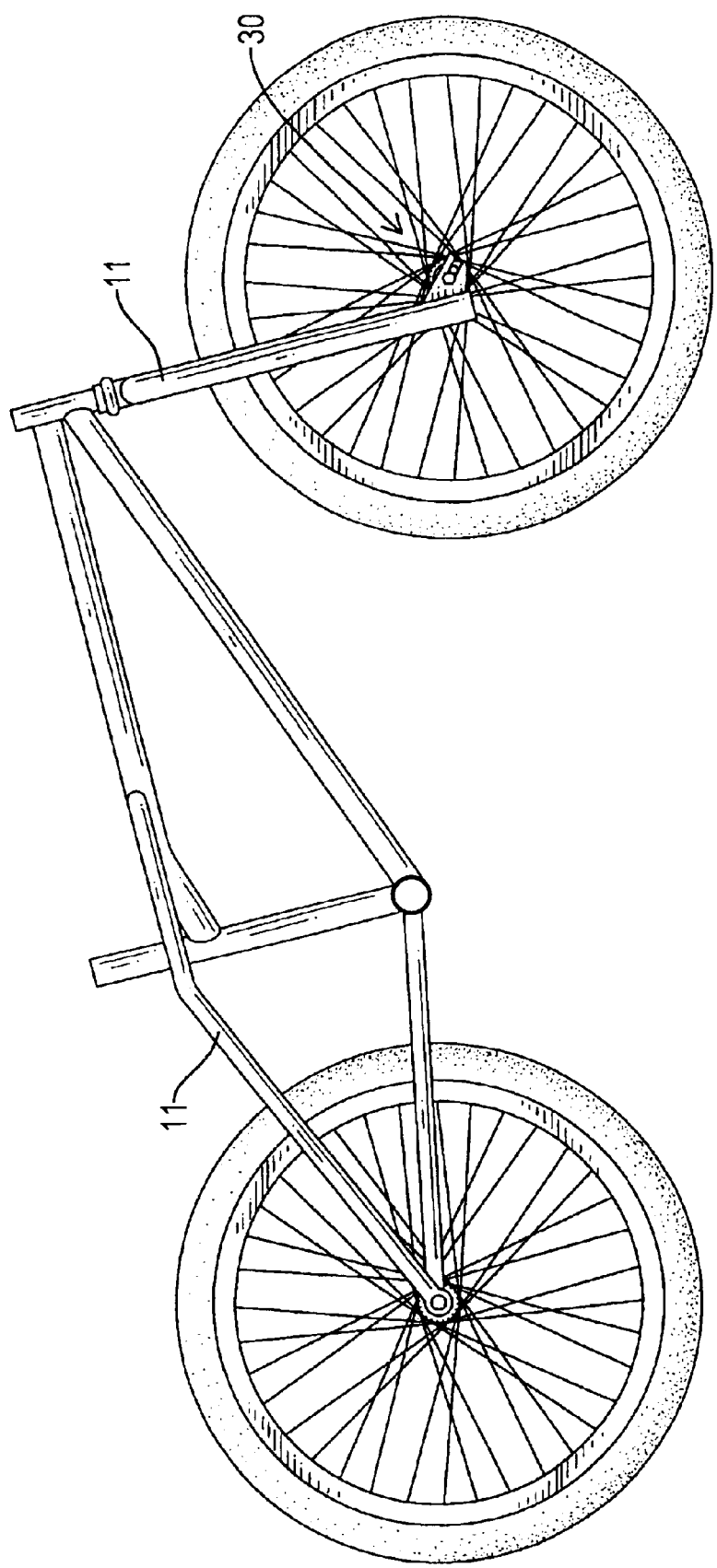
FIG. 1 is a side plan view of a hub post in accordance with the present invention mounted on a bicycle.
Figure 2:
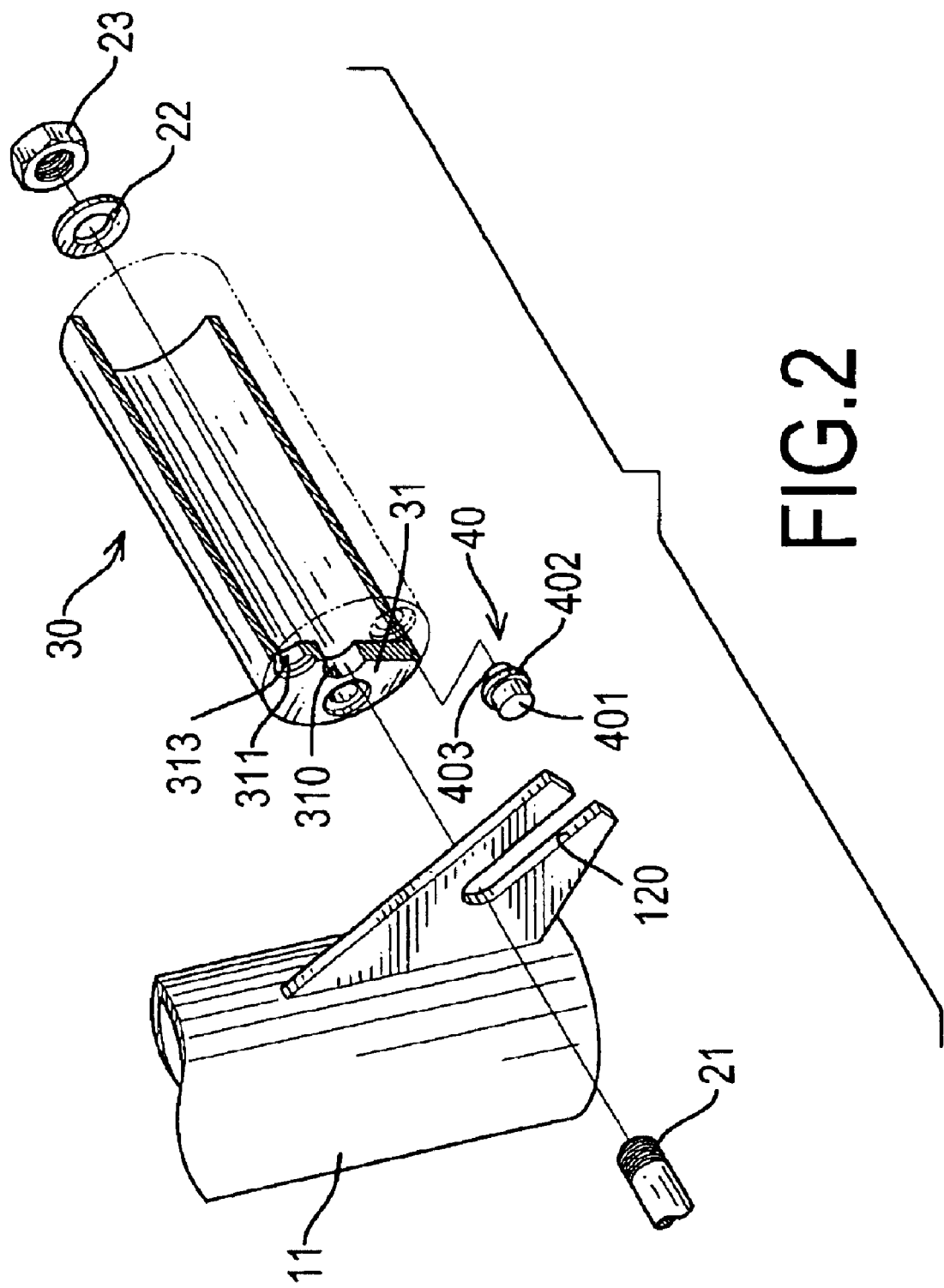
FIG. 2 is an exploded perspective view in partial section of the hub post in FIG. 1 mounted on a fork of a bicycle.
Figure 3:
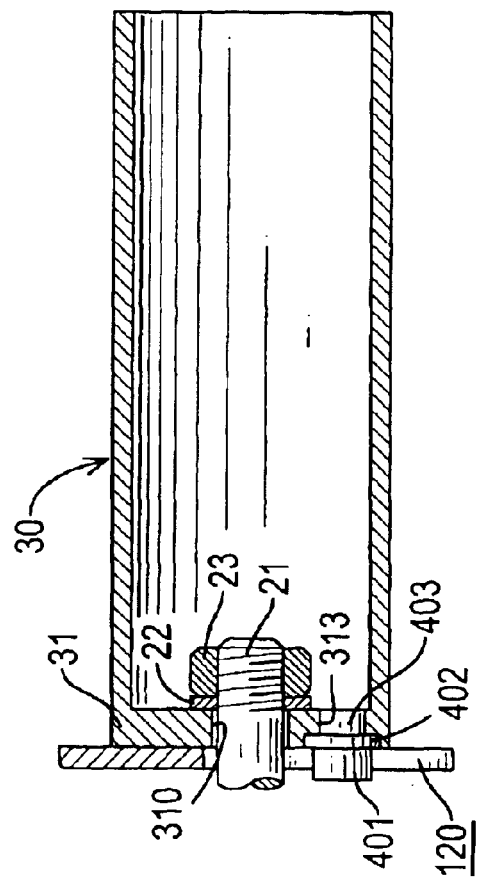
FIG. 3 is a plan view in partial section of the hub post in FIG. 2 mounted on a fork of a bicycle.
Figure 5:
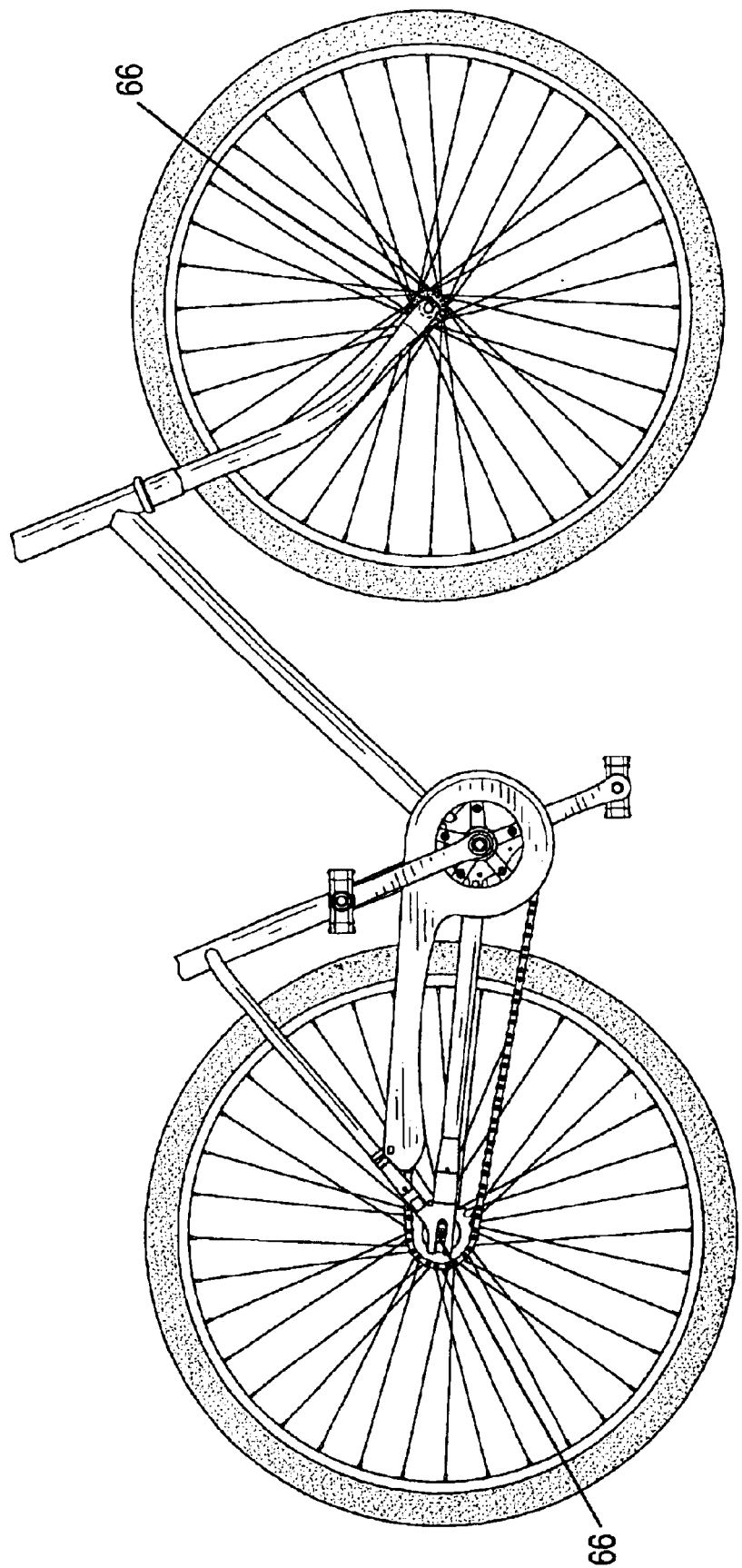
FIG. 5 is a side plan view of a conventional hub tube in accordance with the prior art mounted on a bicycle.
Figure 7:
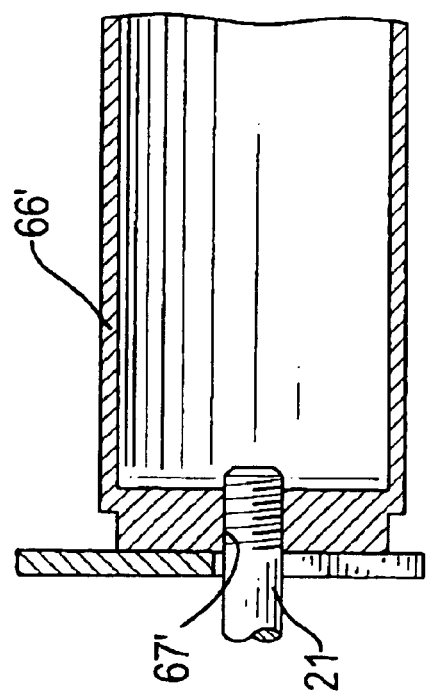
FIG. 7 is a side plan view in partial section of a second embodiment of the conventional hub post in FIG. 5 mounted on a fork of a bicycle.
Figure 6:
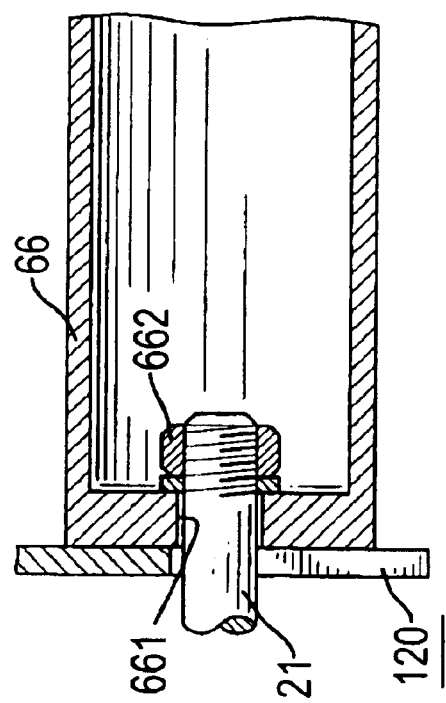
FIG. 6 is a side plan view in partial section of a first embodiment of the conventional hub post in FIG. 5 mounted on a fork of a bicycle.

With reference to FIGS. 1 to 3, a hub post (30) in accordance with the present invention is hollow, has an open end (not numbered), a closed end (31) and an anti-rotation locking pin (40) and is attached to a threaded end (not numbered) of an axle (21) of a bicycle (10) with axle slots (120) in forks (11) of the bicycle (10).

The closed end (31) of the hub post (30) is attached to the threaded end of the axle (21) and has an inside surface (not numbered), an outside surface (not numbered), multiple countersunk through holes (313) and a central through hole (310). The countersunk through holes (313) are formed around the central through hole (310), and each countersunk through holes (313) has an annular shoulder (311) defined on the outside surface of the closed end (31). Preferably, there countersunk through holes are defined in the closed end (31). The anti-rotation locking pin (40) has a concentrically formed slot pin (401), an annular flange (402) and a mounting pin (403) and is selectively mounted in one of the multiple countersunk through holes (313) and the axle slot (120). The mounting pin (403) is mounted in and extends into the selected countersunk through hole (313), and the annular flange (402) abuts the annular shoulder (311) in the countersunk through hole (313).

Figure 4:
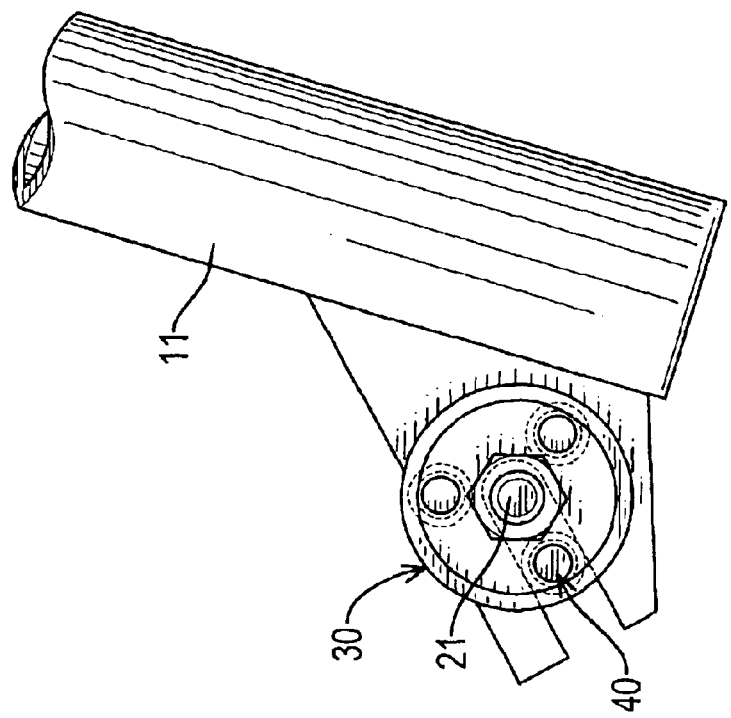
FIG. 4 is a plan view of the hub post in FIG. 3 mounted on the fork of the bicycle.

With further reference to FIGS. 3 and 4, the hub post (30) is attached to the axle (21) mounted in the axle slot (120) by mounting the central through hole (310) in the closed end (31) around the threaded end of the axle (21) and screwing a nut (23) with a washer (22) onto the threaded end of the axle (21). Before the nut (23) is tightened on the threaded end of the axle (21), the mounting pin (403) of the anti-rotation locking pin (40) is mounted in one of the countersunk through holes (313), and the slot pin (401) is mounted in the axle slot (120).

The hub post (30) in accordance with the present invention has the following advantages.

1. The hub post (30) mounted on the bicycle (10) is held in place by the axle (21) and the anti-rotation locking pin (40) simultaneously, so the hub post (30) extends firmly and securely out from the axle (21).

2. If one of the countersunk through holes (313) deforms or expands, other countersunk through holes (313) can be used, and the hub post (30) can be used safely much longer.

3. The hub post (30) can be formed in different shapes, such as a triangular, square, pentagonal, etc. post. When the hub post is rotated and the anti-rotation locking pin (40) is inserted into a different countersunk through hole (313), the hub post (30) will present a different angle on which a person can stand standing.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed is to be understood.

What is claimed is:

1. A hub post for a bicycle having an axle slot in a fork and an axle extending through the axle slot, the hub post being hollow and comprising an open end;

a closed end with an outside surface having
- a central through hole adapted for being mounted around and attached to the on end of the axle, and
- multiple countersunk through holes defined around the central hole and each countersunk through hole having an external shoulder facing the outside surface, and an anti-rotation locking pin selectively mounted in one of the countersunk through holes, adapted to be mounted in the axle slot through which the axle extends and having
- a slot pin mounted in the axle slot;
- an annular flange abutting the annular shoulder in the selected countersunk through hole; and
- a mounting pin mounted in and extending into the selected countersunk through hole.

2. The hub post for a bicycle as claimed in claim 1, wherein three countersunk through holes are defined in the closed end.

\* \* \* \* \*